(12) United States Patent
Teague et al.

(10) Patent No.: US 12,517,276 B2
(45) Date of Patent: Jan. 6, 2026

(54) METHOD FOR COMBINING THE RESULTS OF ULTRASOUND AND X-RAY AND NEUTRON CEMENT EVALUATION LOGS THROUGH MODALITY MERGING

(71) Applicant: Visuray Intech Ltd. (BVI), Tortola (VG)

(72) Inventors: Philip Teague, Houston, TX (US); Alex Stewart, San Francisco, CA (US)

(73) Assignee: Visuray Intech Ltd (BVI), Road Town (VG)

( * ) Notice: Subject to any disclaimer, the term of this patent is extended or adjusted under 35 U.S.C. 154(b) by 83 days.

(21) Appl. No.: 17/837,529

(22) Filed: Jun. 10, 2022

(65) Prior Publication Data

US 2022/0299669 A1    Sep. 22, 2022

Related U.S. Application Data

(63) Continuation of application No. 17/233,005, filed on Apr. 16, 2021, now abandoned, which is a
(Continued)

(51) Int. Cl.
*G01V 1/50*    (2006.01)
*E21B 47/002*    (2012.01)
(Continued)

(52) U.S. Cl.
CPC ............ *G01V 1/50* (2013.01); *E21B 47/0025* (2020.05); *E21B 47/005* (2020.05); *G01V 1/44* (2013.01);
(Continued)

(58) Field of Classification Search
CPC ... G01V 1/50; G01V 1/44; G01V 5/04; G01V 5/107; G01V 11/00; G01V 1/46;
(Continued)

(56) References Cited

U.S. PATENT DOCUMENTS

2016/0061991 A1* 3/2016 Berkcan ................. G01V 5/145
 250/269.2
2016/0326865 A1* 11/2016 Zhang ................... E21B 47/005
(Continued)

*Primary Examiner* — John C Kuan
(74) *Attorney, Agent, or Firm* — Adams & Reese LLP; John Henry Scott, III

(57) ABSTRACT

A combining mechanism for borehole logging tool data that employs modality merging to combine the output data of various borehole logging tools to provide a combined result and automated interpretation is provided, said mechanism comprising: at least one mechanism for assigning interpretive values to individual processed data types; at least one mechanism for combining the interpretive value data sets; and, at least one mechanism for providing an interpretation. A method of combining borehole logging tool data that employs modality merging to combine the output data of various borehole logging tools to provide a combined result and automated interpretation is also provided, said method comprising: assigning interpretive values to individual processed data types; combining the interpretive value data sets; and, providing an interpretation.

14 Claims, 3 Drawing Sheets

Related U.S. Application Data continuation of application No. 16/139,489, filed on Sep. 24, 2018, now abandoned.

(60) Provisional application No. 62/561,866, filed on Sep. 22, 2017.

(51) Int. Cl.
| | |
|---|---|
| *E21B 47/005* | (2012.01) |
| *G01V 1/44* | (2006.01) |
| *G01V 1/48* | (2006.01) |
| *G01V 5/04* | (2006.01) |
| *G01V 5/10* | (2006.01) |
| *G01V 11/00* | (2006.01) |
| *G06F 18/25* | (2023.01) |
| *G01V 1/46* | (2006.01) |

(52) U.S. Cl.
CPC ............... *G01V 5/04* (2013.01); *G01V 5/107* (2013.01); *G01V 11/00* (2013.01); *G01V 1/46* (2013.01); *G01V 1/48* (2013.01); *G06F 18/25* (2023.01)

(58) Field of Classification Search
CPC ..... G01V 1/48; E21B 47/0025; E21B 47/005; G06F 18/25
See application file for complete search history.

(56) References Cited

U.S. PATENT DOCUMENTS

| | | | |
|---|---|---|---|
| 2017/0205388 A1* | 7/2017 | Thomas | G01N 33/383 |
| 2018/0180763 A1* | 6/2018 | Zhang | E21B 47/005 |

* cited by examiner

METHOD FOR COMBINING THE RESULTS OF ULTRASOUND AND X-RAY AND NEUTRON CEMENT EVALUATION LOGS THROUGH MODALITY MERGING

TECHNICAL FIELD

The present invention relates generally to the monitoring and determination of cement integrity, zonal isolation and well integrity, within cemented single or multi-string wellbore environments, and in a particular though non-limiting embodiment to a method of use of three-dimensional x-ray-based data and/or neutron porosity data to inform the interpretation of ultrasound data collected from the same borehole.

BACKGROUND

Within the oil & gas industry, the requirement to gauge the quality of cement through multiple casings is paramount, as is the ability to determine the status of the annuli. The industry currently employs various methods for the verification of the hydraulic seal behind a single casing string. Typically, ultrasonic tools are run within the well to determine whether cement is bonded to the outside of the casing, thereby indicating the presence of cement in the annulus between the casing and formation, or between the casing and an outer casing. Ultimately, a leak-off pressure test is required to ensure that zonal isolation has been achieved as ultrasonic tools are highly dependent upon the quality of the casing, the bond between the casing and the material in the annulus, and the mechanical properties of the material in the annulus in order to work correctly. In addition, ultrasonic tools treat the material in the annulus as a single isotropic and homogenous volume, any actual deviation away from this ideal leads to inaccuracies in the measurement.

The majority of petrophysicists working as log interpreters within the field are highly adept at interpreting ultrasound logs. However, few are experienced at interpreting x-ray density data (especially three-dimensional density data), and fewer still are experienced at interpreting neutron porosity data when considering three-dimensional x-ray and neutron porosity together with ultrasound, which can lead to poorly interpreted data sets and result in sub-optimal results and determinations.

Cement bond logs (CBL) are still run today because they are relatively inexpensive and almost every wireline company has a version of the tool. The logs typically illustrate the use of the acoustic amplitude curve to indicate cement bond integrity. In a CBL log in well bonded cement, low amplitude generally means a good bond is present. Most logs run today have additional computed curves, as well as a Variable Density Log display of the acoustic waveforms.

The CBL uses conventional sonic log principals of refraction to render measurements. In particular, sound travels from the transmitter, through the mud, refracts along the casing-mud interface, and then refracts back to the receivers. In fast formations (i.e., faster than the casing), the signal travels up the cement-formation interface, and arrives at the receiver before the casing refraction. The amplitude is typically recorded on the log in millivolts, or as attenuation in decibels/foot (db/ft), or as bond index, or any two or three of these. A travel time curve is also presented. It is used as a quality control curve. A straight line indicates no cycle skips or formation arrivals, so the amplitude value is reliable. Skips may indicate poor tool centralization or poor choice for the trigger threshold.

The actual value measured is the signal amplitude, as measured in millivolts. Attenuation is calculated by the service company based on its tool design, casing diameter, and transmitter to receiver spacing.

Compressive strength of the cement is derived from the attenuation with a correction for casing thickness. Finally, bond index is calculated by the equation:

$$BI = A/A_{max}$$

Where:
$A$=Attenuation at any point on the log (db/ft)
$A_{max}$=Maximum attenuation (db/ft)

While the important results of a CBL are easily seen on a conventional CBL log display, such as signal amplitude, attenuation, bond index, and cement compressional strength, an additional display track is normally provided. This is the variable density display (VDL) of the acoustic waveforms, which provides a visual indication of a free or bonded pipe (as do the previously mentioned curves), but also show the effects of fast formations, and decentralized pipe. The display is created by transforming the sonic waveform at every depth level to a series of white-grey-black shades that represent the amplitude of each peak and valley on the waveform. Zero amplitude is grey, negative amplitude is white, and positive amplitude is black. Intermediate amplitudes are illustrated as intermediate shades of grey.

The ultrasonic imaging technique produces acoustic borehole imaging logs. The ultrasonic imaging technique is a cased hole cement bond/cement mapping tool, but with more complete coverage of the borehole. This tool type is sometimes referred to as a rotating-head bond tool. In addition, precise acoustic measurements of the internal dimensions of the casing and of its thickness provide a map-like presentation of casing condition including internal and external damage or deformation. Rotating head ultrasonic (acoustic) imaging tools are the current state of the art for cement and casing integrity mapping. The typical sonde tool includes a rotating transducer subassembly available in various sizes so that all customary casing sizes can be logged. The direction of rotation of the subassembly controls the orientation of the transducer—counterclockwise for the standard measurement mode (transducer facing the casing or the borehole wall), and clockwise to turn the transducer 180 degrees within its subassembly (transducer facing a reflection plate within the tool) to measure downhole fluid properties. The fluid properties are used to correct the basic measurements for environmental conditions.

Analysis of the reflected ultrasonic waveforms provides information about the acoustic impedance of the material immediately behind the casing. A cement map presents a visual indicator of cement quality.

While current methods offer some information regarding the cement bond of the inner-most casing, they do not have the ability to discriminate between and amongst various depths into the cement or annular material. This leads to the possibility that fluid-migration paths may exist at the cement-formation boundary, within the cement itself, or between the casing and an outer casing, thereby leading to a loss of zonal isolation. One reason for this is the use of a mathematical model, which describes mechanical properties (such as the speed of sound) associated with the material. However, typically, these models are simplified and assume that the casing is concentric and coaxial within the borehole (or other casings) and that the density of the material is homogeneous through the 360 degree azimuthal region of the cement/material in the annulus.

The use of the ultrasonic waveforms may be used to evaluate the quality of the cement or annular materials located between casing and a formation, or between the casing and a further casing. Further, ultrasonic logging may be used for flaw detection in the cement by determining whether material behind the casing is solid or fluid, based upon the time of arrival of reflected signals. A logging tool, which may have one or more ultrasonic transmitters and one or more ultrasonic receivers, is lowered into a wellbore and measurements are taken at various depths. Ultrasonic waves are transmitted from the logging tool towards the formation, and reflected from the casing, cement sheath, and formation. The reflected waves are received, recorded, processed, and interpreted to determine the presence, or lack thereof, of cement between the casing and the formation or other wellbore wall.

The ultrasonic waveform can then be used to evaluate the cement bond by determining the impedance of the material next to the casing itself. The impedance is a function of both bulk density and the speed of sound of the drilling fluid, casing, cement, and formation. The impedance is mathematically calculated using estimated properties of the casing, cement, mud and other materials in a complicated method requiring extensive knowledge of the well make-up for a particular well. Typically, the mathematical model assumes that the well casing is coaxial and concentric, and that the cement volume is complete (e.g., between casing and formation, or between casing and casing) and the material homogenous. Any deviation from this ideal forms the basis for 'interpreted anomalies' in the cement. However, in practice, the casings are seldom perfectly coaxial and concentric, and the cement density varies anisotropically due to the uniformity of the lay-up and curing. As a result, the ultrasonic interpretation is inferred and based upon an idealized model, which when compared to real-life geometries leads to false positives, which inherently degrades the quality of the resulting interpretation.

Generally, traditional ultrasonic logging techniques can only provide the acoustic impedance of the material behind the casing. It is a challenge for ultrasonic logging to fully invert related important material properties, such as material velocity and density. Moreover, ultrasonic logging tools are not capable of discriminating the size of any gap or channel present in the cement volume. For example, a void between the casing and the cement sheath will give the same reading regardless of whether the void is a millimeter thick or centimeters thick.

Ultrasonic data informs a different aspect of the cement properties behind casing than does x-ray density or neutron porosity measurements. X-ray density measurements offer the opportunity to create a three-dimensional density map of the cement volume surrounding the casing and is unaffected by the mechanical bond between the casing and the cement. Likewise, neutron porosity measurements can give an indication of porosity of the cement and be correlated with x-ray density data to corroborate the presence of a fluid channel through the cement volume, for example, and is not affected by micro-annulus or delamination issues between cement and casing. However, ultrasound techniques become blind when perfectly good cement is detached from the casing by only a 20-30 micron gap, but in the cement is well bonded to the casing, offer an excellent measurement of the quality of the seal between the casing and the cement, and whether at least 0.5" of cement is attached to the outside of the casing.

Prior art discloses a variety of techniques that use ultrasound, x-rays, neutrons or other radiant energy to attempt to infer an interpretation individually, regarding which an experienced interpreter must survey and consider producing a final opinion. Prior art also discloses of a variety of techniques that attempt to integrate density, ultrasound and/or neutron porosity data to produce higher quality images. However, none have addressed the opportunity to automatically combine the results of the data to produce a simple single log that can determine issues with the cement, and what those issues most likely are, based upon the nature of the merging of the individual data types.

US2018/0180765 to Teague et al teaches a method and means for improving the resolution and determination of the density of the materials surrounding a wellbore in a package that does not require direct physical contact with the well casings (i.e., non-padded). The invention taught herein consists of a method and means for using a pseudo-conical x-ray beam, located within a non-padded, concentrically-located borehole logging tool for the purpose of detecting density variations within the annular materials surrounding a borehole within single or multi-string cased-hole environments. The arrangement of the collimated detectors permits the collection of data that relates specifically to known azimuthal and radially located regions of interaction (azimuthally distributed depths of investigation). When the tool is moved axially within the well, a three-dimensional map of the densities of the annular materials surrounding the borehole can be created such that variations in the density of the annular materials may be analyzed to look for issues with cement integrity and zonal isolation, such as channels or holes in the annular materials that could transmit pressure.

US2018/0188411 to Teague et al. teaches methods and means for improving the resolution and determination of the density of the materials surrounding a wellbore, in a package requiring no direct physical contact with the well casings (i.e., non-padded). The method and means described herein comprise using an actuated combination of collimators located cylindrically around an x-ray source, located within a non-padded concentrically-located borehole logging tool, for detecting density variations within the annular materials surrounding a borehole within single or multi-string cased-hole environments. The actuation of collimators permits the operator to choose between a fixed collimator mode in which the output is an azimuthal array of a plurality of x-ray beams, and an actuated collimator mode in which a single or plurality of individual azimuthally-arranged x-ray beams scan azimuthally through the rotation of one of the collimators. In addition, said actuation permits the operator to select a further non-rotating-mode in which the collimator sleeve switches among various angles or declinations of x-ray beam outputs with respect to the major axis of the tool.

U.S. Pat. No. 9,817,152 to Sofiienko et al. teaches a method and means to create a three-dimensional map of cement, casings and formation surrounding a cased borehole, using x-ray radiation to illuminate the casings, annular materials and formation. Further, it teaches a means for producing a voxelated map that contains axial, radial and azimuthal density variations, and thereby the geometry and form of the cement surrounding the cased hole.

US2018/0120474 to Teague et al. teaches a method and means for enabling a wireline operator to evaluate the homogeneity of cement behind a casing through azimuthal neutron porosity imaging. Generally, the underlying goal of the process is to determine cement integrity and zonal isolation. The methods and means also permit evaluation of cement behind the casing when the wireline tool is located within tubing inside the cemented casing. This is especially useful when considering plug and abandonment operations where it would be advantageous to determine the nature of the zonal isolation and the integrity of cement disposed within the casing prior to removal of the tubing.

US2003/0223620 to Anxionnaz et al. discloses methods of producing 'images' of underground formations surrounding a borehole. Anxionnaz deals with comparisons of existing data sets/logs that have already been taken and is, as such, a post-processing of data in an attempt to glean or tease additional information from the combination of logged data types and produce a visualization scheme to aid analysis by a human. In essence, Anxionnaz discloses a method for combining the data from various petrophysical measurements to create a pseudo three-dimensional map of borehole surroundings based upon key inputs and assumptions being entered into a computational model. According to the disclosure, a micro-sensitivity log may be compared with the data relating to the orientation of the tool such that the micro-sensitivity as a function of azimuth may be normalized to azimuth, so that a prescribed azimuthal direction can be determined as the reference coordinate when comparing with other logged data. In addition, a litho-density log may be normalized to tool azimuth information, remembering that litho-density logs are one-dimensional, with respect to constituting a measure of density in a single azimuth as a function of wellbore depth (axial). In that respect, a typical litho-density log does not discriminate between various azimuths nor does it provide radial (into the formation away from the borehole) information. A similar technique can be used with porosity logs. However, it should be noted that a person skilled in the art knows that neutron porosity logs only provide information of the porosity of the material surround the borehole with no distinct radial or azimuthal component—i.e., a one-dimensional log vs. axial depth. According to Anxionnaz, when multiple logs of different types and from different azimuths have been accumulated (noting that in each log the tool would probably point in different directions as the operator has little control over the azimuthal orientation of the tool), and each log has been normalized to ensure a similar reference coordinate system is being used, then it may be possible to reconstruct a "three-dimensional" image of the borehole. It should be noted, however, that the term "three-dimensional" reconstruction in this respect consists of no radial information, i.e., the third dimension is achieved by curving a two-dimensional computationally produced image into a cylinder, thereby achieving a pseudo three-dimensional image.

WO2017/023282 to Zhang et al. discloses a method of using x-ray density data to determine the most probable attenuation properties of the material isotropically, typically by surrounding a cased wellbore such that the speed of sound of the material can be used to inform the inversion of ultrasound data as a function of depth. The technique assumes that the x-ray density data provided for the cement, represented by a single azimuth (i.e., looking radially outward in one direction) is representative of the cement in all directions, and at all radial depths into the cement. As such, the technique only uses x-ray data to determine the cement density on the assumption that it is isotropic and homogenous, and that the casing itself is perfectly coaxial and concentric within the borehole and/or other casings.

WO2014/1866640 to Van et al. discloses methods and means for evaluating proper cement installation in a well. The method includes receiving acoustic cement evaluation data having a first parameterization. At least a portion of the entire acoustic cement evaluation data may be corrected to account for errors in the first parameterization, thereby obtaining corrected acoustic cement evaluation data. This corrected acoustic cement evaluation data may be processed with an initial solid-liquid-gas model before performing a posteriori refinement of the initial solid-liquid-gas model, thereby obtaining a refined solid-liquid-gas model. A well log track-indicating whether a material behind the casing is a solid, liquid, or gas may be generated by processing the corrected acoustic cement evaluation data using the refined solid-liquid-gas model.

US2014/0052376 to Guo et al. discloses a method for evaluating cement quality in a cased well. A single azimuth density log of the well is obtained using, for example, gamma ray sources and detectors. The detector count rates are inverted to provide initial estimates of cement density and thickness in a single azimuth. Acoustic waveform data are obtained from the well using an acoustic logging tool. The acoustic data are inverted, using the initial estimates of cement density and thickness obtained from the density logs wherein the model is assumed to be coaxial and homogeneous, and an updated density log is inferred. Cement 'images' are obtained from the updated density log, and cement bond quality can be estimated.

U.S. Pat. No. 6,876,721 to Siddiqui discloses a method to correlate information taken from a core-sample with information from a borehole density log. The core-sample information is derived from a CT scan of the core-sample, whereby the x-ray source and detectors are located on the outside of the sample, and thereby configured as an outside-looking-in arrangement. Various kinds of information from the CT scan such as its bulk density is compared to and correlated with the log information.

U.S. Pat. No. 6,078,867 to Plumb discloses a method for generating a three-dimensional graphical representation of a borehole, comprising the steps of: receiving caliper data relating to the borehole, generating a three-dimensional wire mesh model of the borehole from the caliper data, and color mapping the three-dimensional wire mesh model from the caliper data based on either borehole form, rugosity and/or lithology.

SUMMARY

A combining mechanism for borehole logging tool data that employs modality matching to combine the output data of various borehole logging tools to provide a combined result and automated interpretation is provided, said mechanism comprising: at least one mechanism for assigning interpretive values to individual processed data types; at least one mechanism for combining the interpretive value data sets; and, at least one mechanism for providing an interpretation.

A method of combining borehole logging tool data that employs modality matching to combine the output data of various borehole logging tools to provide a combined result and automated interpretation is also provided, said method comprising: assigning interpretive values to individual processed data types; combining the interpretive value data sets; and, providing an interpretation.

BRIEF DESCRIPTION OF SEVERAL EXAMPLE EMBODIMENTS

The methods described herein use the outputs of various log data provided from borehole logging tools, which have been deployed in the same well, and combine them in such a way that the combination of the log data produces a more accurate interpretation of the data as compared to interpretation of each data log in a side-by-side comparison.

Figure 1:
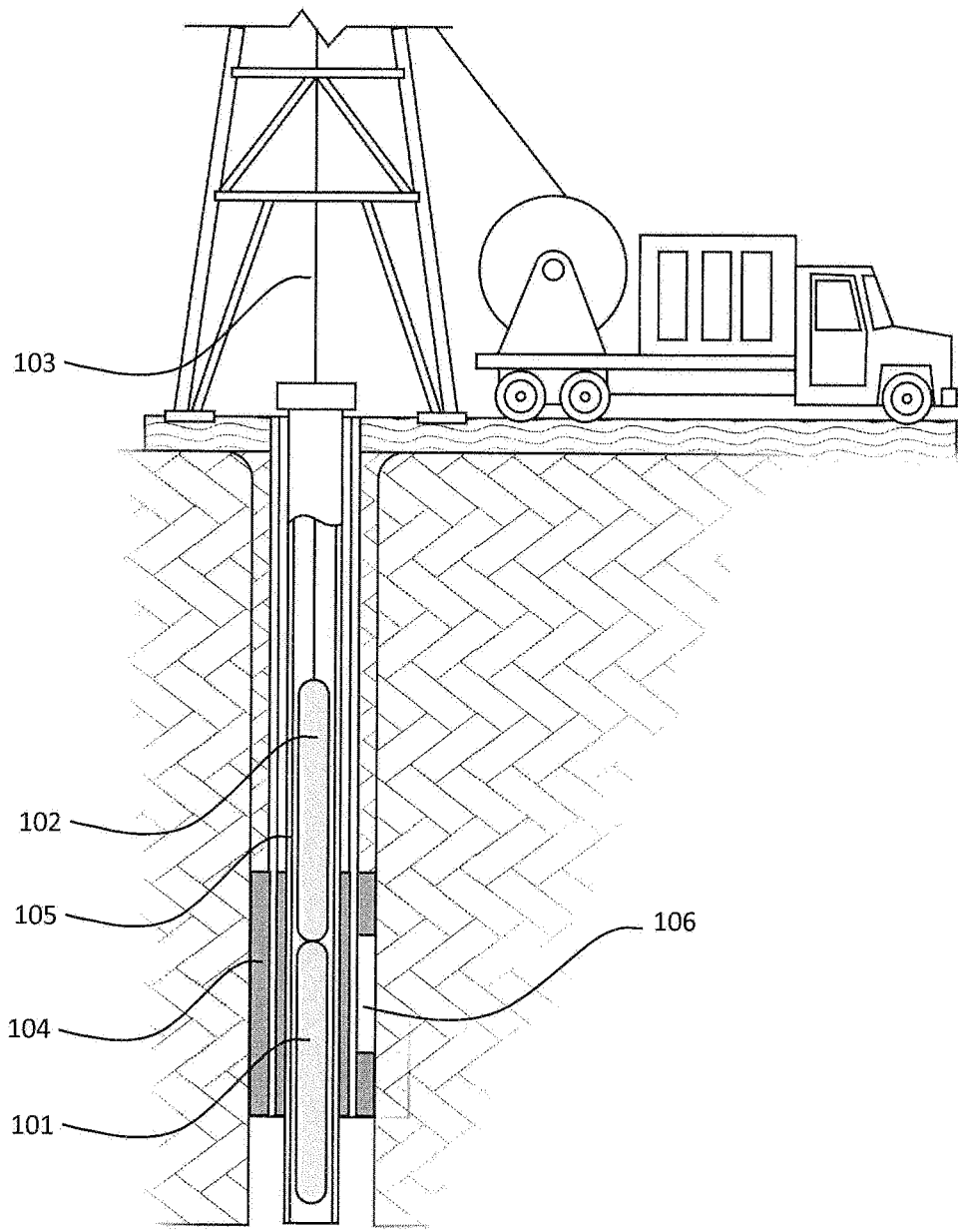
FIG. 1 illustrates an example ultrasonic wellbore tool combined with an x-ray-based wellbore tool being lowered into a well by means of wireline conveyance.

With reference now to FIG. 1, in one example embodiment an ultrasonic logging tool [101] is accompanied by an x-ray cement evaluation and/or neutron porosity tool [102] by wireline conveyance [103] into a cased borehole, wherein the cemented section of the well [104] is logged through the inner-most casing or tubing [105]. The cemented section of the well [104] can contain discontinuities/anomalies [106] that can adversely affect well integrity.

Figure 2:
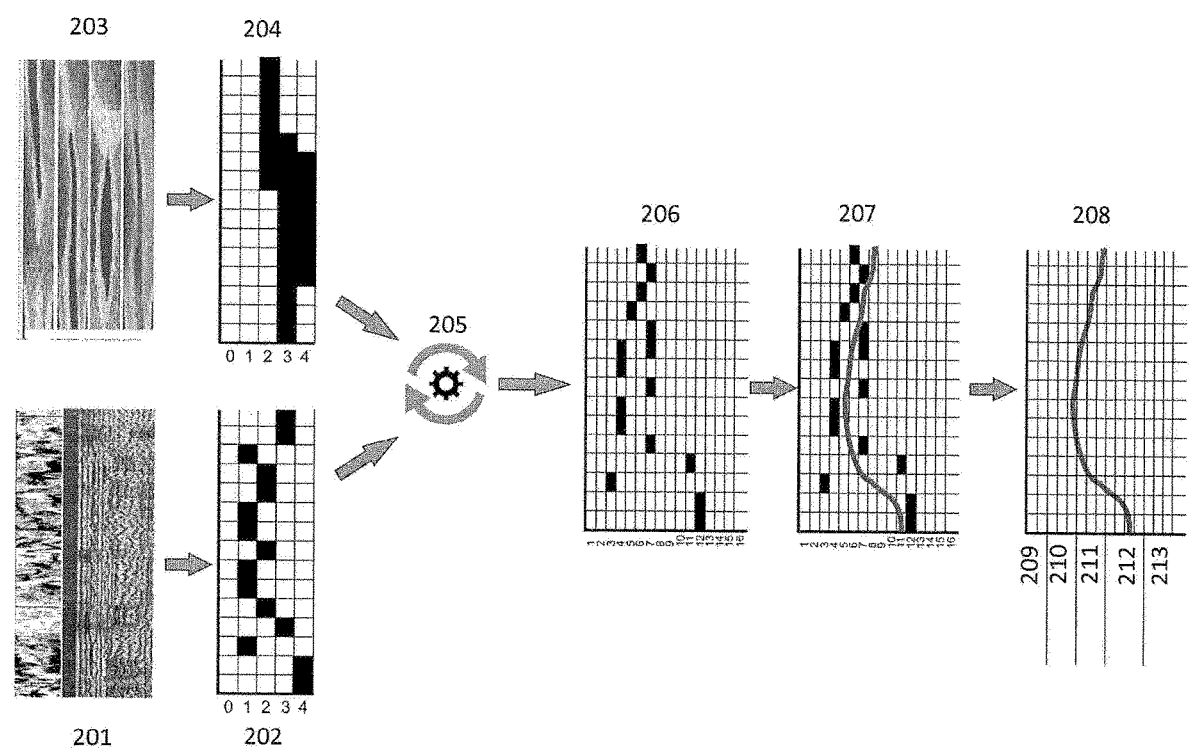
FIG. 2 illustrates an example of how ultrasound data may be combined with x-ray data using a modality merging technique to provide a better interpretation than both data-types being examined separately.

FIG. 2 illustrates how inverted and processed ultrasound images or logs [201], are further processed as a function of depth in order to assign an interpretive modal value to the data [202] as a function of log depth, which reflects the quality of the bond and the acoustic impedances (relating to density) within the cement mass surrounding the casing. For example, an assigned value of "0" would indicate a perfect cement bond, and a highly homogeneous cement volume attached to the casing at that depth, whereas a value of "4" indicates that there is no cement bond whatsoever in that region. Values in between would be based upon the analysis of the acoustic/ultrasound log(s) at that depth such that "1" could indicate a good cement bond having issues within the cement mass are noted, and "3" could indicate a nominal cement bond having significant issues in the cement mass. Processed three-dimensional x-ray density data [203] is further processed to assign an interpretive modal value to the data [204], as a function of log depth, which reflects the completeness/homogeneity of the cement mass and the likelihood of major anomalies or channels within the cement. For example, an assigned value of "0" would indicate a perfectly homogeneous and isotropic cement density distribution within the cement volume located in the annulus, whereas a value of "4" would be representative of significantly missing cement in the annulus, or the indication of a continuous channel through the cement volume within that interval/depth-range. An assigned value of "2" could indicate a shallow anomaly (close to the casing), whereas "3" may indicate a deep anomaly within the cement volume. After ensuring that both model matrices are correlated and matched for depth, the modal matrices are merged through a further processing step [205] which produces a resultant value based upon the weighting of the significance of the data to the overall solution. The resultant value matrix (as a function of logged depth) [206] can then be filtered as necessary [206, 207] to produce an informative log [207] that indicates the most likely solution of the merging of the modal matrices. For example, an ultrasound modal value of "4" (indicating no cement bond) combined with an x-ray modal value of "1" would indicate that the cement volume was mostly complete, but that delamination (micro-annulus) had occurred between the casing and the cement—which would be typical within an old well (during a plug and abandonment operation). The resultant merged value of "4" would fall within the "delaminated cement" [210] region of the interpreted cement log [208]. A very high value on the informative log [207], for example above "12", would indicate that both ultrasound modal data and x-ray modal data concur that there is no cement present behind the casing at that depth interval. A very low value, such as "1" or "2" would indicate that both ultrasound modal data and x-ray modal data concur that the cement is well bonded and there is a homogeneous and isotropic volume of cement within the annular region behind the casing, represented by the "good cement" [209] region on the interpreted cement log [208]. Regions on the interpreted cement log [208], could indicate "good cement" [209], "delaminated cement" [210], "deep channel present" [211], "shallow channel present" [212], and "no cement present" [213].

Figure 3:
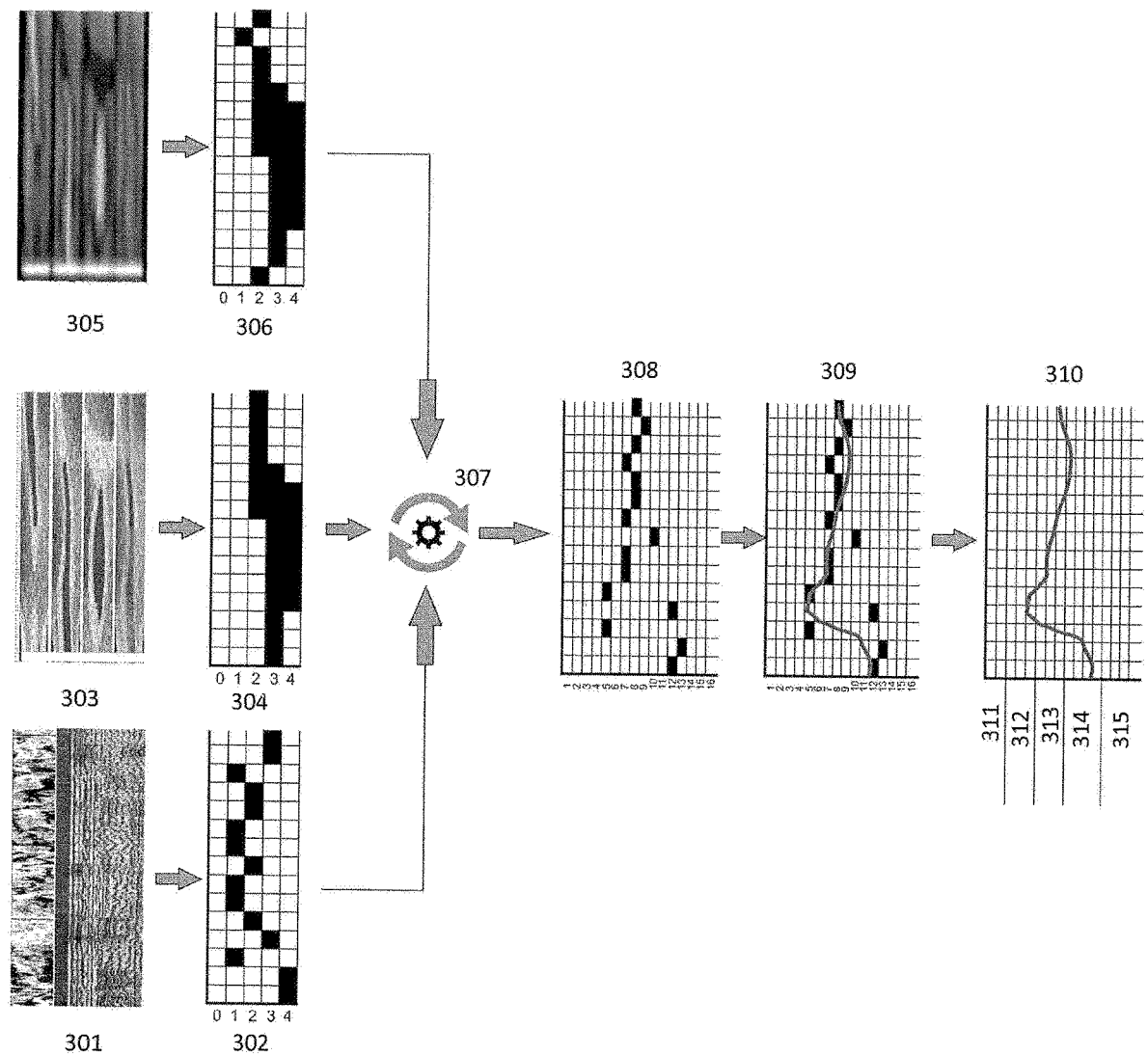
FIG. 3 illustrates an example of how ultrasound data may be combined with x-ray data and neutron porosity data using a modality merging technique to provide a better interpretation than all three data-types being examined separately.

With further reference to the attached figures, FIG. 3 illustrates how inverted and processed ultrasound images or logs [301], are further processed as a function of depth to assign an interpretive modal value to the data [302], as a function of log depth, which reflects the quality of the bond and the acoustic impedances (relating to density) within the cement mass surrounding the casing. Processed three-dimensional x-ray density data [303] is further processed to assign an interpretive modal value to the data [304], as a function of log depth, which reflects the completeness/homogeneity of the cement mass and the likelihood of major anomalies or channels within the cement. Processed three-dimensional neutron porosity data [305] is further processed to assign an interpretive modal value to the data [306], as a function of log depth, which reflects the porosity within the cement mass and the likelihood of major anomalies or channels within the cement. This can be compared and correlated directly with the x-ray data modal values [304] to ascertain whether a region which is indicating the presence of a fluid channel also correlates with a relative increase in cement porosity within the same depth interval. After ensuring that all model matrices are correlated and matched for depth, the modal matrices are merged through a further processing step [307] which produces a resultant value based upon the weighting of the significance of the data to the overall solution. The resultant value matrix (as a function of logged depth) [308] is then filtered as necessary [308, 309] to produce an informative log [309] that indicates the most likely solution of the merging of the modal matrices. Regions on the interpreted cement log [310], could indicate "good cement" [311], "delaminated cement" [312], "deep channel present" [313], "shallow channel present" [314], and "no cement present" [315].

In a further embodiment, other input log types, such as open-hole gamma logs, pulse-echo measurements, gamma-gamma density logs and/or neutron-gamma density logs can be combined with ultrasound and other acoustic techniques and nuclear methods through the technique of modal merging to provide more accuracy to the automatic interpretation algorithm.

In a further embodiment, machine learning can be employed to analyze the results of the modal matrix merging and quality index flags (produced from the inversion of the raw data) to determine whether the selection of data applicability weightings were appropriately selected during the modal merging process, and improve/iterate the possible combination scenarios to improve the overall matrix merging algorithm based upon the study of historical inputs and outputs to the scheme, in addition to machine input 'quality feedback' from a human operator.

The foregoing specification is provided only for illustrative purposes, and is not intended to describe all possible aspects of the present invention. While the invention has herein been shown and described in detail with respect to several exemplary embodiments, those of ordinary skill in the art will appreciate that minor changes to the description, and various other modifications, omissions and additions may also be made without departing from the spirit or scope thereof.

The invention claimed is:

1. A method comprising:
causing first and second borehole logging tools to emit ultrasound energy and non-ultrasonic radiant energy, respectively, while the first and second borehole logging tools are positioned within a borehole defined by a casing;
discretizing ultrasonic log data as a function of depth to generate a first dataset that characterizes a first property of cement surrounding the casing with respect to depth, the ultrasonic log data formed by processing ultrasonic measurement data output by the first borehole logging tool using the ultrasound energy;
discretizing non-ultrasonic log data as a function of depth to generate a second dataset that characterizes a second property of the cement with respect to depth, wherein the first and second properties are different, and the non-ultrasonic log data formed by processing non-ultrasonic measurement data output by the second borehole logging tool using the non-ultrasonic radiant energy;
informing an inversion of the ultrasonic measurement data using the non-ultrasonic measurement data as a function of depth; and
determining integrity of the cement with respect to depth using a third dataset that comprises a weighted combination of the first and second datasets.

2. The method of claim 1, further comprising:
processing the ultrasonic measurement data from the first borehole logging tool to generate the ultrasonic log data.

3. The method of claim 1, wherein the non-ultrasonic measurement data is x-ray density data, and the method further comprises:
processing the x-ray density data from the second borehole logging tool to form the non-ultrasonic log data.

4. The method of claim 1, wherein the non-ultrasonic measurement data is neutron porosity data, and the method further comprises:
processing the neutron porosity data from the second borehole logging tool to form the non-ultrasonic log data.

5. The method of claim 1, wherein the non-ultrasonic measurement data is neutron activation data, and the method further comprises:
processing the neutron activation data from the second borehole logging tool to form the non-ultrasonic log data.

6. The method of claim 1, wherein the first or second borehole logging tools comprise a wireline-based tool.

7. The method of claim 1, wherein the first or second borehole logging tools comprise a logging-while-drilling-based tool.

8. The method of claim 1, further comprising:
creating a three-dimensional representation of the second property with respect to depth using the non-ultrasonic measurement data.

9. A method comprising:
causing a first logging tool to generate ultrasonic measurement data using ultrasound energy, the first measurement data characterizing a first property of a cement volume surrounding a borehole with respect to depth;
causing a second logging tool to generate non-ultrasonic measurement data using non-ultrasonic radiant energy, the non-ultrasonic measurement data characterizing a second property of the cement volume with respect to depth, wherein the first and second properties are different;
quantizing ultrasonic log data comprising the ultrasonic measurement data by automatically assigning discrete values from a first set of discrete values for the first property to the ultrasonic log data as a function of depth to generate a first dataset that characterizes the first property of the cement volume with respect to depth;
quantizing non-ultrasonic log data comprising the non-ultrasonic measurement data by automatically assigning discrete values from a second set of discrete values for the second property to the non-ultrasonic log data as a function of depth to generate a second dataset that characterizes the second property of the cement volume with respect to depth; and
processing the first dataset and the second dataset using a modality merging technique to generate a third dataset that characterizes integrity of the cement volume with respect to depth, wherein processing the first and second datasets using the modality merging technique comprises informing an inversion of the ultrasonic measurement data using the non-ultrasonic measurement data as a function of depth.

10. The method of claim 9, wherein the non-ultrasonic radiant energy includes x-ray radiation or neutron radiation.

11. The method of claim 9, wherein processing the first dataset and the second dataset using the modality merging technique comprises correlating and matching respective values of the first and second datasets with respect to depth.

12. The method of claim 9, wherein processing the first dataset and the second dataset using the modality merging technique comprises assigning different weights to respective values of the first and second datasets.

13. The method of claim 9, further comprising:
filtering the third dataset to generate an informative log that includes continuous values for the integrity of the cement volume with respect to depth.

14. The method of claim 9, further comprising:
adjusting one or more weights assigned to respective values of the first and second datasets using a machine learning technique.

* * * * *